Oct. 7, 1969   L. R. YESKE   3,470,683
SIDE DELIVERY RAKE

Filed Oct. 26, 1966   5 Sheets-Sheet 1

INVENTOR.
Laurel R. Yeske
BY
Geo. J. Muckenthaler ATT'Y
                     AG'T Oct. 7, 1969 L. R. YESKE 3,470,683
SIDE DELIVERY RAKE
Filed Oct. 26, 1966 5 Sheets-Sheet 2

INVENTOR.
Laurel R. Yeske
BY
Geo. J. Muckenthaler ATT'Y
E. O. Godard AG'T

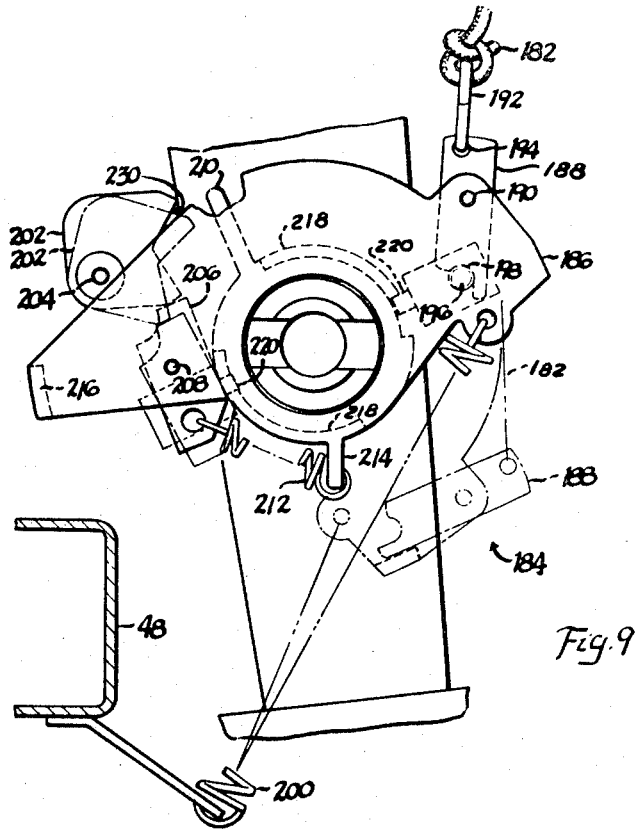
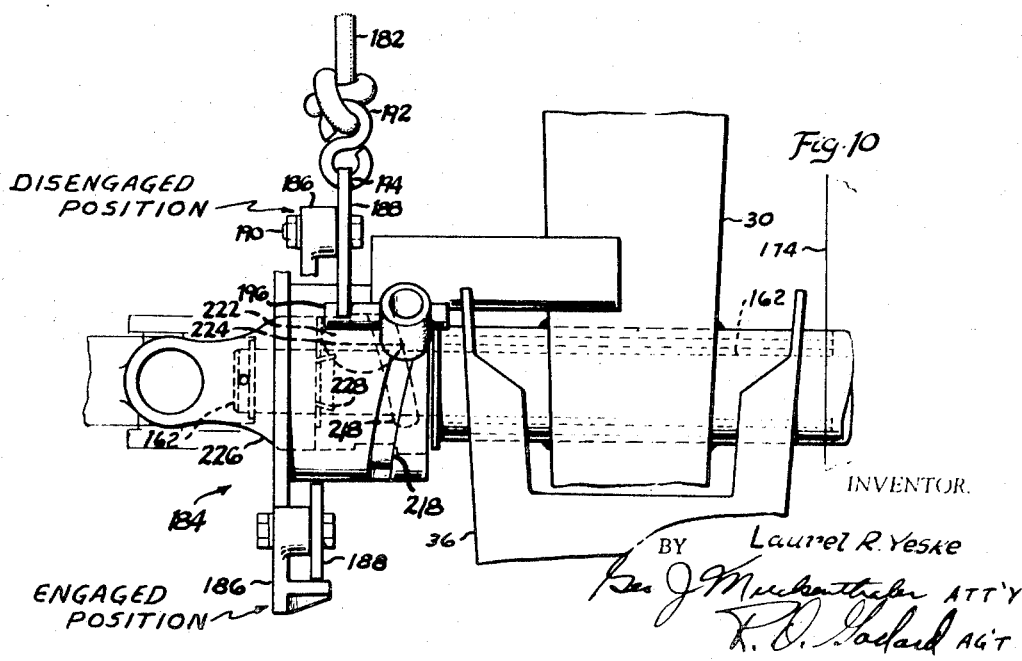

{United States Patent Office}

3,470,683
Patented Oct. 7, 1969

3,470,683
SIDE DELIVERY RAKE
Laurel R. Yeske, Rockford, Ill., assignor to J. I. Case Company, Racine, Wis., a corporation of Wisconsin
Filed Oct. 26, 1966, Ser. No. 589,727
Int. Cl. A01d 77/06
U.S. Cl. 56—377                                11 Claims

ABSTRACT OF THE DISCLOSURE

A side delivery rake which includes a main frame adjustably supporting a sub frame which has the raking means supported thereon. The main frame is floatingly supported by resilient means interposed between the ground engaging wheels and the frame and the floating mechanism is rendered inoperative when the frame is moved to the raised position by lifting means. The rake further includes improved clutch forming part of the drive mechanism for the raking means.

---

The present invention relates to a side delivery rake of the type having offset wheels and adapted to be towed by a tractor.

The present trend towards improving reliability, capability, and efficiency in farm machinery requires that new ideas and concepts be tried and tested in the haying fields. For instance, the raking of hay into windrows requires the timely moving of the hay such that there is a maximum gathering with a minimum loss of foliage. The raking reel with the rake teeth must be constructed to work in varying crop yields in uneven fields, and to move the hay to one side in a smooth flowing manner. This construction, of course, is dependent upon frame and reel supporting structure in cooperation with the suspension system and the ground engaging wheels.

An object of the present invention is to provide an improved lift and floating mechanism for a side delivery rake.

Another object is to provide means for mounting a rake reel including reel bars which are subject to less stress and shock loads.

A further object is to provide a rake with improved teeth mounting means.

Another object is to provide a rake with a reel frame which moves as a unit with the main frame.

Still another object is to provide means on the rake for independent movement of the supporting or ground engaging wheels.

A further object to to provide a suspension system which allows the rake reel to float, in addition to the lifting action.

Another object is to provide means for driving the rake reel from either one or both of the supporting wheels.

Another object is to provide a rake with an improved release and engage clutch mechanism.

Figure 1:
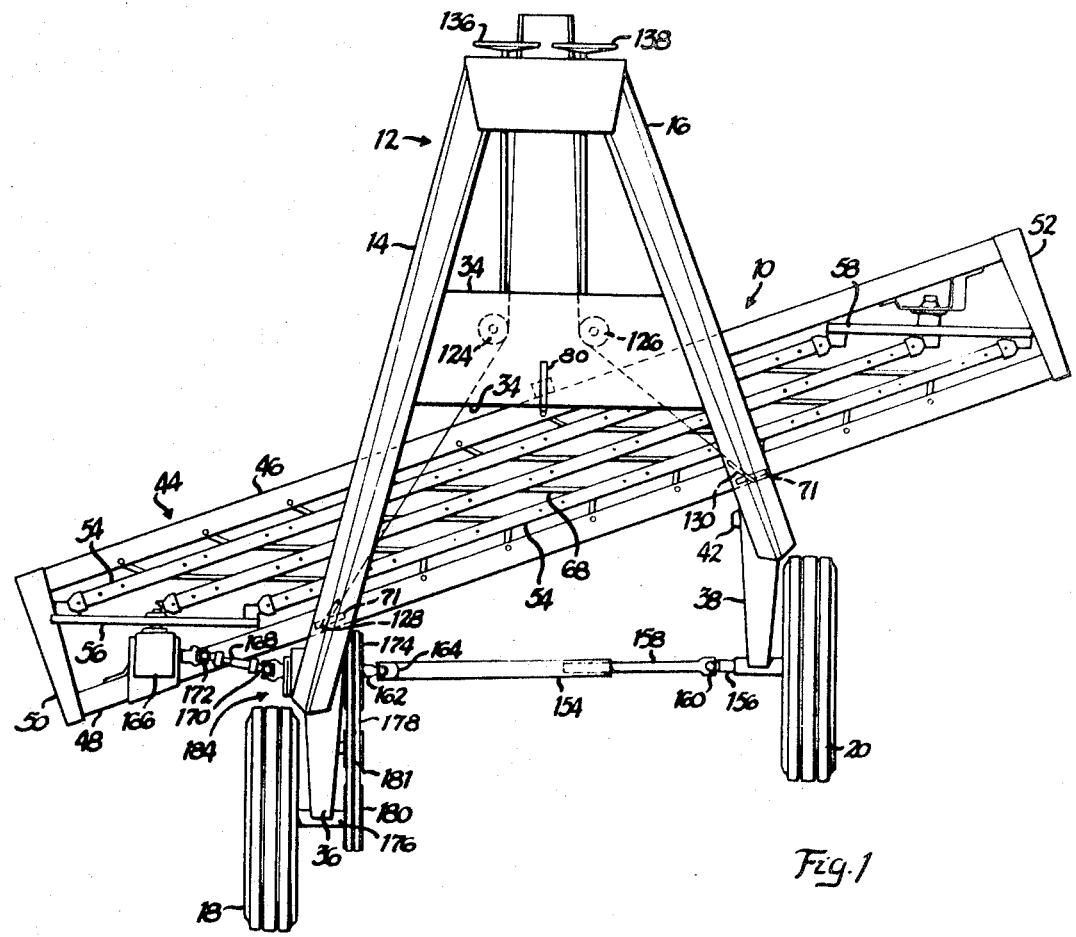
Figure 4:
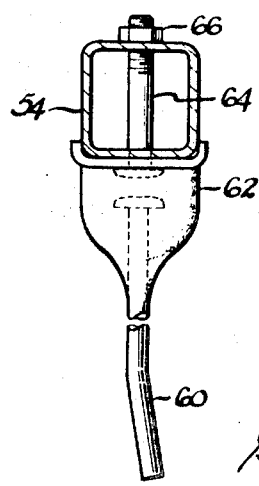
Figure 2:
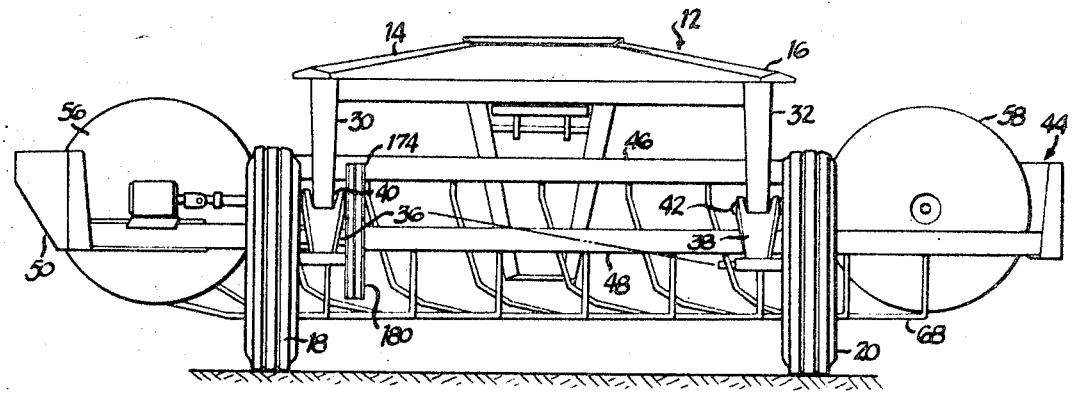
Figure 3:
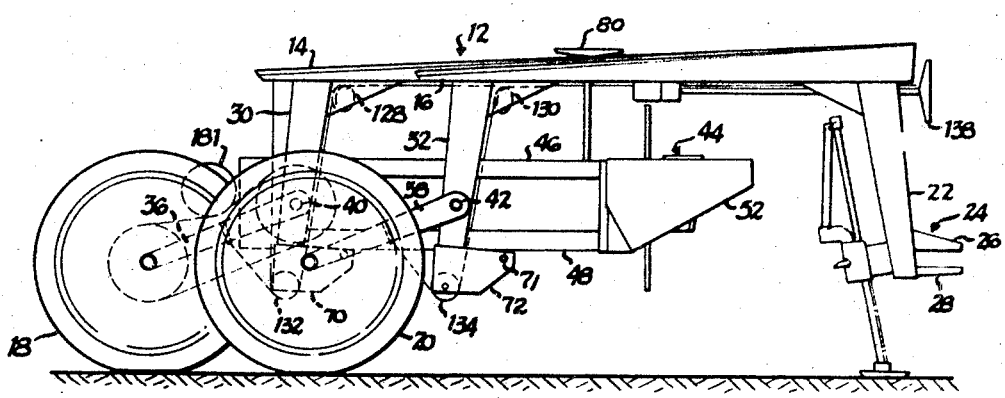
Figure 5:
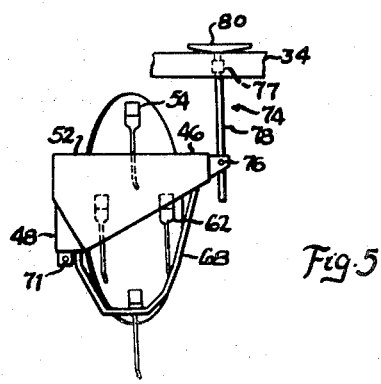
Figure 6:
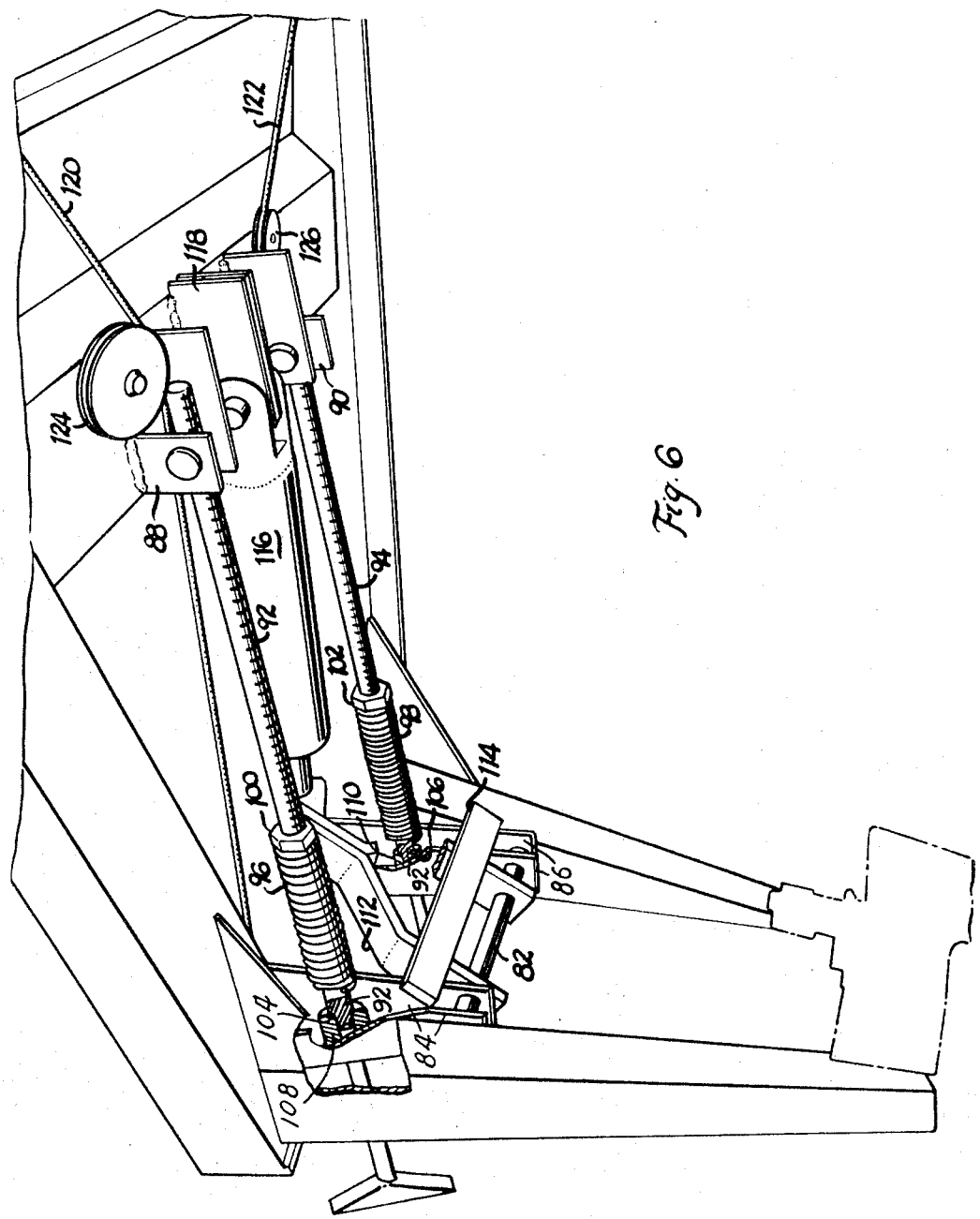
Figure 7:
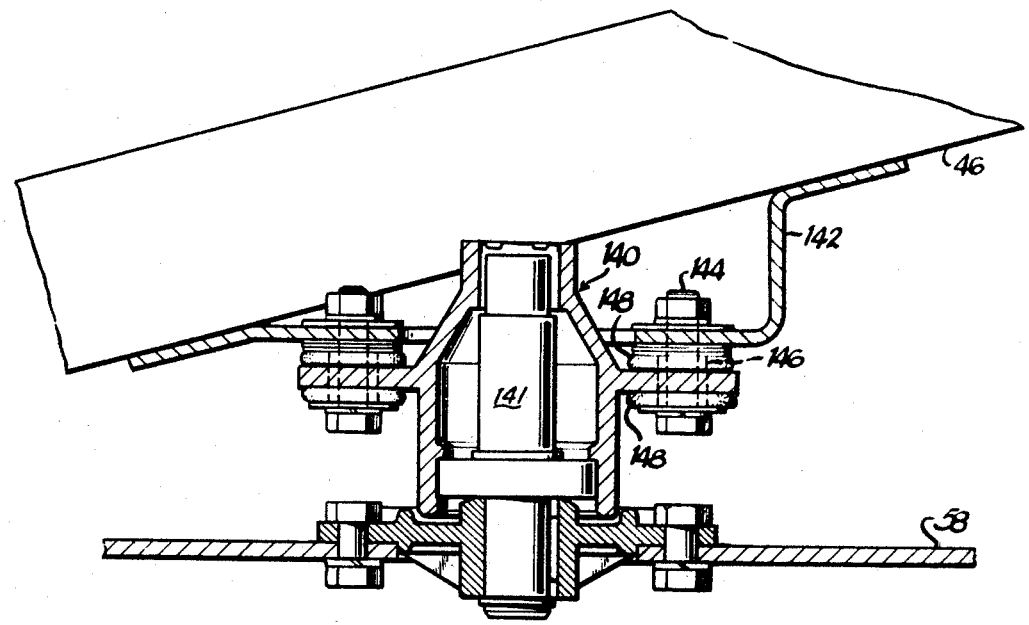
Figure 8:
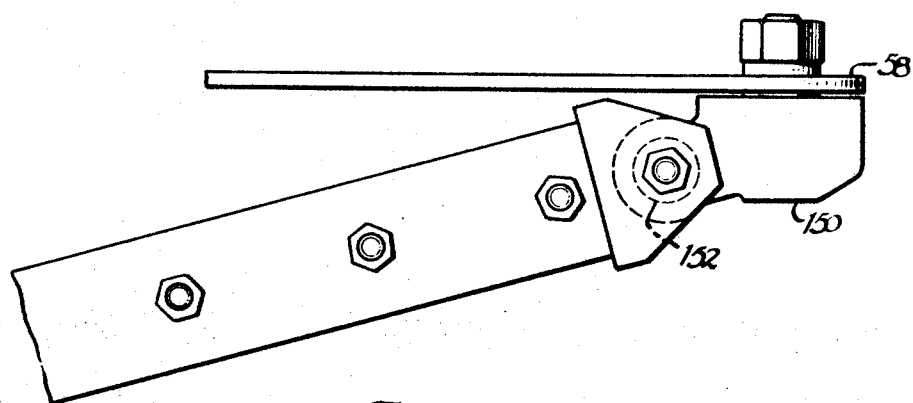

Additional objects and advantages will become apparent from a reading of the following description and the annexed drawings, in which:

FIGURE 1 is a plan view of the invention showing a preferred embodiment;
FIG. 2 is a rear view of FIG. 1 with parts removed;
FIG. 3 is a side view of FIG. 1 with parts removed;
FIG. 4 is an enlarged view showing the rake tooth mounting on the reel bar;
FIG. 5 is an end view of the rake reel showing the adjusting means;
FIG. 6 is an enlarged view showing the lift and floating mechanism at the forward end of the rake;
FIG. 7 is an enlarged plan view of the reel mounting at one end thereof;
FIG. 8 is a view showing the reel bar mounting;
FIG. 9 is an enlarged end view of the clutch mechanism; and
FIG. 10 is a side view of the clutch mechanism shown in FIG. 9.

As seen in FIGS. 1, 2, and 3, there is a side delivery rake generally designated as 10 which includes a main frame 12 having fore-and-aft extending members 14 and 16 carried on supporting or ground-engaging wheels 18 and 20. Frame 12 has secured thereto a forward member 22, as shown in FIG. 3, which extends downwardly and which carriers a hitch 24 for connecting to a towing vehicle. The rake is normally drawn by a tractor (not shown) which has provision for supplying hydraulic fluid under pressure to a towed implement. The fluid is a conventional means for supplying the force for raising and lowering an implement so this feature will not be further described. Hitch 24 has an upper portion 26 and a lower portion 28 which engage with the drawbar of the tractor and a pin is used to connect and secure these parts.

Frame 12 has secured near the ends of members 14 and 16, a pair of downwardly extending rear members 30 and 32. Forward member 22 and rear members 30 and 32 are preferably welded to fore-and-aft members 14 and 16. It is thus seen that members 14, 16, 22, 30 and 32 form a strong, rugged frame structure with a brace 34 connecting the members 14 and 16. Rear members 30 and 32 have pivoted thereto wheel arms 36 and 38 rotatably secured by pivots 40 and 42. This feature allows for independent suspension of the supporting wheels 18 and 20 in relation to the main frame 12.

A reel frame or sub frame generally designated as 44 is carried by the main frame 12, the sub frame being disposed in a diagonal direction which, of course, is a requirement in a side delivery rake. As seen in the plan view, the sub frame is disposed diagonally to the line of travel and the hay or other material is moved from right to left to be placed in a windrow. Sub frame 44 includes a forward member 46 and a rear member 48 secured together at the ends thereof by side plates 50 and 52. A raking reel or cage includes a plurality of reel bars 54, as shown in FIGS. 4 and 5 and, in the present embodiment, four in number, which bears are journaled in bearings at the ends thereof to reel plates 56 and 58, the plates forming a part of the rake and supported from the sub frame. As the plates 56 and 58 are rotated by the driving mechanism, the reel bars also rotate in the usual and well-known manner. Reel bars 54 are preferably of square tubular construction to which are attached the rake teeth 60 as shown in FIG. 4. Each tooth 60 is mounted in a block of rubber 62, the block being rigidly secured to the bar 54 by means of a bolt 64 and a nut 66. The bolt is attached in the same block as is tooth 60. The block of rubber secured to the square tube provides a positive securing of the rake tooth as compared to other designs utilizing round bars or tubes. Sub frame 44 also includes a plurality of stripper bars 68 which are secured at the ends thereof to members 46 and 48. As the reel rotates, the rake teeth are positioned on the reel bars such that they move in a direction between the strippers. The strippers are formed generally in a U-shape and extend downwardly between the forward and rear supports in the usual manner.

The reel frame 44 is prefarably secured at three points and moves as a unit with the main frame in relation to the ground. Member 30 has a bracket 70 securely bolted or welded thereto and member 32 has a bracket 72 as seen in FIG. 3. Reel frame member 48 is supported on a pivot pin 71 from each bracket 70 and 72 such that the sub frame and main frame move up and down as a unit. Referring to FIG. 5, reel frame member 46 or the front member is provided with an adjusting means 74. Member 46 has a threaded trunnion 76 secured thereto, and a threaded rod 78 with attached handle 80 extends through brace 34, the rod also engaging with a trunnion 77. As the handle 80 is turned, the front member 46 is moved up and down and the reel is tilted as desired. This adjusting means provides for approximately 10 degrees tilt on either side of a normal position. The pivots 71 come into use only when the front of the sub frame is adjusted up or down to change the angle of the teeth in relation to the ground.

The lift and floating mechanism of the sub frame and reel assembly in relation to the main frame and ground wheels will now be described. A shaft 82 is positioned on the front member 22, as seen in FIG. 6. Two arms 84 and 86 are independently pivotally supported from shaft 82 and extend generally upwardly from the shaft. Brace 34 has trunnions 88 and 90 attached to the underside thereof and threaded rods 92 and 94 are engaged with trunnions 88 and 90 and extend forwardly toward arms 84 and 86. Rod 92 has a spring 96 and rod 94 has a spring 98 encircling the rod, and nuts 100 and 102 are threaded on the rods to maintain the springs in compression. Rod 92 also has a stop 104 and rod 96 has a stop 106 at the forward end thereof, the springs surrounding the stops and engaging with respective thrust bearings 108 and 110 carried by arms 84 and 86. Each of arms 84 and 86 are regulated independently of each other in that the purpose of the spring tends to thrust the arms off the stops at the ends of the threaded rods. Thrust bearings 108 and 110 are positioned on arms 84 and 86 such that stops 104 and 106 normally rest against the bearings when the main frame is in the raised position but the bearings are movable relative to the stops by the springs 96 and 98 when the main frame is in the lowered position, and adjustment of rods 92 and 94 does not change the pre-set of the assist springs 96 and 98.

Shaft 82 also carries a yoke 112 extending upwardly therefrom, the yoke having a bar 114 secured to the rear side thereof. A hydraulic cylinder 116 is connected to one end of yoke 112 and to a bracket 118 secured to the underside of brace 34. A pair of cables 120 and 122 are secured to arms 84 and 86 at the upper ends thereof and are trained rearwardly around pulleys 124 and 126 attached to the underside of brace 34. Another pair of pulleys 128 and 130 are attached to the members 14 and 16 near the rear ends thereof and the cables are trained around these pulleys, then downward along rear members 30 and 32, around pulleys 132 and 134 attached at the bottom end of members 30 and 32 and the cables are then secured to the underside of wheel arms 36 and 38 as seen in FIG. 3. The springs acting against the arms 84 and 86 on shaft 82 and cooperating with the cables attached to the arms and to the wheel arms 36 and 38 provide the floating and assisting lift action. These springs are normally adjusted to assist in the lifting of the rake but do not carry the full load.

The hydraulic system also includes the hydraulic hose lines connected to the tractor and to the cylinder 116. Therefore, the hydraulic system provides the primary lifting force for the rake and the spring-loaded rods acting against arms 84 and 86 provide the floating action and also an assist for the lifting action. The assisting pressure of each spring provides a minimum effort to move the reel upward from the ground as uneven or irregular surfaces are encountered in the operation of the rake. The load is supported through arms 84 and 86 against the stop ends of the threaded rods, and since the rake is normally in a floating condition due to the compression on the springs, the reel frame is not subject to bounce and the rake teeth are protected and are kept properly disposed in relation to the ground. Handles 136 and 138 are provided on the front of the rake and accessible to the tractor operator for adjusting the threaded rods 92 and 94. By use of the thrust bearings on arms 84 and 86, the adjustment of the threaded rods for reel elevation in relation to the ground does not change the pre-set of the assisting springs.

The yoke 112 is pivotable on shaft 82 relative to arms 84 and 86 and when the cylinder rod is extended the yoke with its attached bar 114 moves forward and engages arms 84 and 86. The yoke being securely positioned transversely along shaft 82 engages both arms, however, if one arm is forward of the other due to adjusting of one side of the rake or because of irregular ground contours, the yoke will engage the rear arm first and then equalize the disposition of the arms. Further extension of the cylinder rod urges both arms forward pulling on cables 120 and 122 and causing wheels 18 and 20 to rotate about pivots 40 and 42, thus raising the rake in relation to the ground. Retraction of the cylinder rod returns the yoke to a rearward position and the load through the cables returns the arms 84 and 86 to the original pre-set position determined by the stops on the threaded rods. This action of lift and float is accomplished by reason of the ground wheels being pivoted on the main frame which accomplishes the desired results through a knee-action principle. This principle of construction allows the reel frame and the main frame to move up and down as a unit, and therefore the lift and suspension action depends from the ground wheel and wheel arm structure.

Another important feature of the rake construction includes the mounting of the bearing housing assembly at the side of the reel. As seen in FIG. 7, a housing 140, containing 141, of the type for carrying one end of the rake reel is used and is secured to a bracket 142 fixed to member 46. The bearing is secured to the bracket by means of studs or bolts 144 with a bushing 146 placed on the bolt. Rubber washers 148 are placed around the bushing on either side of the bearing housing attachment portion such that these washers provide flexibility desirable to the structural members and also for manufacturing variations in the length of the reel bars. The thickness of the washers is such that there is a slight compression of rubber within the length of the bushing which feature provides initial resiliency to the assembly. In this respect the resilient mounting of the reel bars on the reel plates 56 and 58 is similar, and as seen in FIG. 8, this mounting includes pivotable bearing housings 150 with resilient bushings 152 to relax strain and shock to the bearings and structure. The rubber bushings further compensate for manufacturing variation in lengths of the reel bars, which bars rotate with the reel plates.

It is thus seen that herein described thus far is an improved side delivery rake structure which includes a rugged frame, means for floating and lifting the frame in relation to the ground by reason of the knee-action of the supporting wheel attachment to the main frame, and the resilient mounting of the reel cage and reel bars.

The engagement and disengagement of the drive mechanism to the rake reel is accomplished by means of a clutch means interposed in the drive chain. The driving mechanism, as shown in FIG. 1, includes a driving shaft 154 connected to the right-hand wheel 20 and extending in the direction of the left-hand wheel 18. The driving member 156 of the right-hand wheel is coupled to a slidable portion 158 of shaft 154 by means of a buckle 160. A left-hand portion 162 of the shaft is journaled in frame member 30 and is incorporated in the pivot 40. Portion 162 is coupled to shaft 154 by means of a buckle 164. A gear box 166 is supported from frame member 48 near the left-hand side of the rake and is drivingly connected to the rake reel plate 56. A shaft 168 is connected at one end to the gear in box 166 and this shaft includes buckles 170 and 172. The other end of shaft 168 is connected to the left-hand portion 162 of shaft 154 and it is at this junction that the clutch is installed. A pulley or sheave 174 is carried on portion 162 and is drivingly connected to the drive shaft 176 of the left-hand wheel 18 by means of a belt 178 on a pulley or sheave 180 carried on shaft 176. A belt tightener 181 is supported from wheel arm 36 for maintaining proper tension on belt 178.

It is thus seen that the wheel arms 36 and 38 are journaled on the driving shafts of the offset supporting wheels and the drive is accomplished from both wheels. The advantages of this construction can be seen in that the wheels 18 and 20 are independently supporting the rake by means of pivots 40 and 42 and the drive mechanism is somewhat flexible between the wheels by reason of the telescoping shaft and the buckles. However, in areas where the crop is sparse and the traction secure, the shaft 154 may be removed and the reel is then driven from the left-hand wheel only. This necessitates only removing the portion of the drive between couples 160 and 164.

FIGS. 9 and 10 show the construction of the clutch which is manually operated by means of a rope control 182 extending from the clutch to a position on the forward part of the rake near the operator. The rope is carried by the frame of the rake, in present instance, in member 14. The clutch, generally designated as 184, includes a clutch arm 186 rotatable around the drive means. A first pawl 188 is pivotally connected to arm 186 by means of a pin 190, and rope 182 is tied to a link 192 which link is connected to pawl 188 through a hole 194. The hole 194 in the pawl 188 is located near one end thereof, offset from the centerline of pivot pin 190 as seen in FIG. 9. A pin 196 is fixed to member 30 of the frame and is positioned to be engageable with pawl 188, the pawl having a slot or notch 198 at the end opposite link 192. Clutch arm 186 has extending portions around the drive and is constructed such that the arm rotates approximately one-third revolution when going from a clutch disengaged position to a clutch engaged position or vice versa. In one position of the clutch arm, the notch 198 is engaged with in 196 and tension is exerted on the arm by means of a spring 200 connected to the arm and also connected to the reel frame 48. It is thus seen that spring 200 tends to rotate arm 186 in a clockwise direction as viewed in FIG. 9.

A second pawl 202 is pivotally connected on pin 204, the pin being fixed to the rake frame so that the pawl does not move around the shaft as does pawl 188. A third pawl 206 is connected to arm 186 by a pivot pin 208. Arm 186 also has a lug portion 210 fixed thereto and extending outwardly from the drive shaft to be engageable with a portion of pawl 202. A spring 212 is connected at one end to a lug 214 fixed to arm 186 and is connected at the other end to pawl 206. Pawl 206 is also engageable with a portion of pawl 202. Arm 186 has what may be called a wiping lug 216 which causes pawl 202 to rotate about pin 204 as the lug engages one side of the pawl during the operation of the clutch.

The clutch arm 186 moves axially along the shaft as the mechanism goes from engaged to disengaged position or vice versa. Arm 186 includes a double helical groove 218, and guide pins 220 fixed to the frame, engage with these grooves. Arm 186 also contains a fixed collar 222 which is free to rotate within the arm. The clutch shaft has a key 224 which engages with collar 222 to cause rotation of the collar whenever the machine is moved and which turns the clutch shaft. The clutch shaft itself does not move transversely. A coupler yoke 226 connected to buckle 170 is on the shaft and is free to rotate thereon. Yoke 226 has two male lugs 228 etxending toward the collar 222 and are positioned to engage collar 222 with yoke 226 whenever arm 186 is moved along the shaft. Collar 222 also has a female recess which receives the male lug 228.

The operation of the clutch mechanism will now be described. In the disengaged position, the clutch arm is positioned as shown in FIG. 9 in solid lines, the notch 198 of pawl 188 being fully engaged with pin 196. When the rope 182 is pulled, the rope tension is guided on a fixed line angle from a point near the rear end of frame member 14, which is above the clutch mechanism, to pawl 188. As mentioned above, the rope is pulling in an off-center position tending to rotate the pawl in a clockwise direction as seen in FIG. 9. As the rope is pulled, the clutch arm and pawl are moved a short distance in a counterclockwise direction to allow the pawl notch 198 to move up and away from pin 196. Of course, the spring 200 is urging the arm and pawl in the clockwise direction and as soon as the pawl 188 is free of pin 196, the clutch arm and attached mechanism are rotated around the shaft by reason of the spring tension. The pawl 188 by reason of its pivotal movement on pin 190 and the offset pull by rope 182 turns in a clockwise direction as it passes pin 196. The rope tension is now relaxed and the spring 200 pulls the clutch arm around and also transversely along the shaft. At the instant of rope pull to disengage pawl 188 from pin 196, pawl 202 is positioned to allow lug portion 210 to pass beneath a portion 230 of pawl 202. After arm 186 has rotated sufficiently to disengage pawl 188 from pin 196, the arm 186 rotates to a clutch engaged position. During this time the portion 216 of arm 186 engages the back side of pawl 202 which wipes the pawl around its pivot 204 in a clockwise direction and which readies the pawl for its function in the disengaging cycle. This is shown in the dotted line location of pawl 202. In the engaging cycle the clutch arm is moved axially along the shaft by reason of the pins 220 riding in the double helical groove and as the male lugs 228 engage in the recesses in collar 222, the keyed collar turns the drive shaft. The position of the clutch arm 186 and pawls 188 and 202 are shown in dotted lines in the engaged position, as shown in FIG. 9. FIG. 10 shows arm 186 and pawl 188 in the lower or engaged position.

To disengage the clutch, the rope is again pulled to overcome the tension of spring 200, and the arm 186 is rotated about the shaft. As the rotation of arm 186 is taking place in a counterclockwise direction, pawl 206 on arm 186 and pivoted thereon, shown in solid lines in the clutch engaged position, passes beneath pawl 202. A lug portion of pawl 206 engages with and rides along a portion of pawl 202 until it reaches a position where pawl 206 engages behind pawl 202. This is shown in the dotted line positions of pawls 202 and 206. At this instant, lug portion 210 engages pawl 202 and also pawl 188 is in a partially engaged position at pin 196. This is when pawl notch 198 is above the pin and the clutch arm is rotated in its maximum position by pulling the rope. The rope is then relaxed and the spring pulls the arm back until the pawl notch 198 rests on pin 196, and during this small clockwise return movement of the notch 198 onto pin 196, pawl 206 is also rotating pawl 202 into the position ready for engaging. With the pawl 188 held in place on pin 196, the clutch arm is in a disengaged position and ready for the engaging cycle. Of course, during the cycle from engaged to disengaged position, the clutch arm and associated mechanism are moved axially along the shaft by reason of pins 220 riding in a double helical groove. The male lugs 228 are disengaged from the recesses in the collar 222, and the drive connection is interrupted. It is thus seen that the repeated pull on rope 182 moves the clutch mechanism around and also axially along the shaft for engaging and disengaging the drive from the rake heel.

It is to be noted that herein shown and described is a side delivery rake which accomplishes all of the objects stated above and the advantages over prior machines of this type.

Variations on the foregoing description will no doubt occur to those skilled in the art; for instance, the means for driving the raking means could be modified by moving the gear box, as shown in FIGS. 1 and 3, to the right of members 14 and 30, and using pulleys and belts to also drive from the gear box to reel plate 56. Another form of drive means could be the use of pulleys and belts from the PTA of the tractor wherein the drive would be connected to reel plate 58. These drives may be more appropriate in some instances wherein the machines also incorporate the unique features of the present invention. It is to be understood that all such variations are contemplated as within the scope of the invention, and the invention is not intended to be taken as limited by the embodiment disclosed.

What is new and desired to be secured by Letters Patent of the United States is:

1. A side delivery rake adapted to be towed by a tractor, said rake including:
    a main frame,
    a sub frame carried by said main frame diagonally to the line of travel,
    raking means connected to said sub frame for moving material to one side thereof,
    means for driving said raking means,
    means supporting said main frame relative to the ground and comprising a pair of members each having one end pivotally supported on the frame, ground engaging means carried by the opposite ends of said members, a pair of cables each having opposite ends with one end connected to separate ones of said members, and pulley means on said frame supporting intermediate portions of said cables, and
    raising and lowering means connected to the opposite ends of said cables and to said main frame whereby actuation of said raising and lowering means will pivot said members on said frame to raise and lower said main frame, said raising and lowering means including a rockshaft connected to said main frame, arm means pivotally connected to the rockshaft with said cables respectively connected to said arm means, threaded means connected to said main frame and engageable with said arm means, resilient means interposed between said arm means and said threaded means for normally floatingly supporting said main frame.

2. A rake in accordance with claim 1 wherein said main frame includes means for tilting said sub frame in relation to said main frame.

3. A rake in accordance with claim 1 wherein said means for raising and lowering also includes yoke means pivotally connected to said rockshaft and engageable with said arm means and
    hydraulic means connected to said main frame and to said yoke means for actuating said connecting means to raise and lower said rake.

4. A rake in accordance with claim 1 wherein said means for raising and lowering includes a stop member on said threaded means engageable with said arm means for cushioning and limiting the up-and-down movement of said raking means in relation to the ground.

5. A rake in accordance with claim 1 wherein said main frame includes downwardly extending rear portions and a downwardly extending front portion, said members being pivotally connected to said rear portions for up-and-down movement of said ground engaging means.

6. A rake in accordance with claim 5 wherein said front portion supports the rockshaft for raising and lowering the rake.

7. A rake in accordance with claim 1 wherein said sub frame is secured to said main frame whereby said sub frame moves as a unit with said main frame in relation to the ground.

8. A side delivery rake adapted to be towed by a tractor, said rake including:
    a main frame,
    a sub frame carried by said main frame diagonally to the line of travel,
    raking means connected to said sub frame for moving material to one side thereof,
    means for driving said raking means,
    clutch means for engaging and disengaging said means for driving,
    means for raising and lowering said main frame, and
    rear supporting wheels spaced and positioned on a line substantially parallel to said sub frame and pivotally connected to said main frame for independent raising and lowering of the sides of said rake,
    said means for driving said raking means including a drive sheave connected to at least one of said wheels,
    a driven sheave,
    a drive shaft supported from said main frame and drivingly connected to said raking means and to said driven sheave, and
    a belt connecting said drive and driven sheaves,
    and said clutch means including an arm rotatably supported from said drive shaft,
    a first pawl pivoted on said arm,
    a first pin fixed on said main frame,
    resilient means urging said pawl into engagement with said pin,
    a second pin fixed on said main frame,
    a second pawl pivoted on said second pin,
    said second pawl being positioned to be engageable by said arm,
    a third pawl pivotable on said arm and adapted to position said second pawl for engage clutch position, and,
    lug means on said clutch engageable with said drive shaft for driving said shaft.

9. A rake in accordance with claim 8 wherein said clutch means includes actuation means for engaging and disengaging said clutch from a position on the tractor.

10. A rake in accordance with claim 8 wherein said means for driving includes:
    a second drive shaft connected to another one of said wheels and to said driven sheave for driving said raking means from the supporting wheels.

11. A rake in accordance with claim 8 wherein said clutch means includes grooves on said arm and guide pins positioned to engage with said grooves for axially moving said clutch means for driving said shaft.

References Cited
UNITED STATES PATENTS

| | | | |
|---|---|---|---|
| 2,746,233 | 5/1956 | McClellan et al. | 56—377 |
| 2,336,117 | 12/1943 | Moschel et al. | 56—377 |
| 2,934,883 | 5/1960 | Morkoski | 56—377 |
| 3,019,586 | 2/1962 | Gustafson | 56—400 |
| 3,074,222 | 1/1963 | Cunningham | 56—376 |
| 3,092,950 | 6/1963 | Johnston | 56—377 |
| 3,103,778 | 9/1963 | Morr et al. | 56—377 |
| 3,104,513 | 9/1963 | Fischer | 56—377 |
| 3,107,476 | 10/1963 | Wathen | 56—377 |
| 3,151,436 | 10/1964 | Johnston | 56—400 |
| 3,157,979 | 11/1964 | Gehman | 56—377 |

LOUIS G. MANCENE, Primary Examiner

P. A. RAZZANO, Assistant Examiner